(12) United States Patent
Hu et al.

(10) Patent No.: US 9,455,795 B2
(45) Date of Patent: Sep. 27, 2016

(54) OPTICAL NETWORK SWITCHING USING N:N TRANSPONDER THROUGH TIME-DOMAIN MULTIPLEXING AND BURST MODE ACCESS

(71) Applicant: NEC Laboratories America, Inc., Princeton, NJ (US)

(72) Inventors: Junqiang Hu, Davis, CA (US); Ting Wang, West Windsor, NJ (US)

(73) Assignee: NEC Corporation (JP)

( * ) Notice: Subject to any disclaimer, the term of this patent is extended or adjusted under 35 U.S.C. 154(b) by 185 days.

(21) Appl. No.: 14/243,068

(22) Filed: Apr. 2, 2014

(65) Prior Publication Data

US 2014/0308037 A1  Oct. 16, 2014

Related U.S. Application Data

(60) Provisional application No. 61/810,801, filed on Apr. 11, 2013.

(51) Int. Cl.
*H04J 14/00* (2006.01)
*H04J 14/02* (2006.01)
*H04J 14/08* (2006.01)

(52) U.S. Cl.
CPC ........ *H04J 14/0257* (2013.01); *H04J 14/0256* (2013.01); *H04J 14/0267* (2013.01); *H04J 14/086* (2013.01)

(58) Field of Classification Search
CPC ............... H04J 14/0257; H04J 14/086; H04J 2011/0003; H04J 2011/0009; H04J 2011/0016; H04J 2011/002; H04J 14/0228; H04J 14/0234; H04J 14/0236; H04J 14/0246; H04J 14/0249; H04J 14/025; H04J 14/0252; H04J 14/0258; H04J 14/0265; H04J 14/0256; H04J 14/0267; H04Q 11/0005; H04B 10/61; H04B 10/611; H04B 10/615; H04B 10/63
USPC ...................................... 398/47, 52
See application file for complete search history.

(56) References Cited

U.S. PATENT DOCUMENTS

| 2010/0158527 | A1* | 6/2010 | Mizutani et al. ...... | H04B 1/707 398/78 |
| 2012/0269515 | A1* | 10/2012 | Cvijetic et al. .... | H04B 10/2507 398/72 |
| 2012/0294614 | A1* | 11/2012 | Cvijetic et al. ..... | H04J 14/0282 398/67 |

* cited by examiner

*Primary Examiner* — M. R. Sedighian
(74) *Attorney, Agent, or Firm* — Joseph Kolodka

(57) ABSTRACT

A network switch is disclosed with each port having the function of: electrical processing and optical modulation; electrical processing has the ability to identify packet or frame destination; burst mode transmission and receiving capability; uses its pre-assigned time slot to send to the corresponding destination, or receive from the expected source.

17 Claims, 9 Drawing Sheets

OPTICAL NETWORK SWITCHING USING N:N TRANSPONDER THROUGH TIME-DOMAIN MULTIPLEXING AND BURST MODE ACCESS

This application claims priority to Provisional Application Ser. No. 61/810,801 filed on Apr. 11, 2013, the content of which is incorporated by reference.

BACKGROUND

The present invention relates to an optical network switch.

Current network systems use either electrical switching (like router or layer-2 switch) or optical point-to-point dedicated link for interconnection. FIG. 1A shows an example network, with 102.a through 102.f representing optical switch; 104.a through 104.d for router or layer-2 switch; 112.a through 112.h for optical WDM (wavelength division multiplexing) link, each representing a fiber with multiple wavelengths; and 114.a through 114.e for electrical connection. The interfaces on 102 that connects 104 are optical transponders that converts electrical signal into optical, with each transponder connects one wavelength. In traditional solution, if traffic from 104.b wants to reach 104.a, there is either a dedicated wavelength connecting 102.c and 102.a (FIG. 1B)), or an intermediate node, say 104.d, that can receive traffic from 104.b and send traffic to 104.a (FIG. 1C)). Electrical switching involves OEO conversion and electrical processing, which is both expensive and power hungry; dedicated optical point-to-point link requires significant number of transponders thus very high cost, in particular when link capacity is much larger than traffic demands.

Two known solutions are available for the aforementioned problem: one is OFDMA (Orthogonal Frequency Division Multiple Access), and the second is InTune Networks' sub-wavelength networking solution Optical Packet Switch & Transport (OPST).

OFDMA uses subcarrier multiplexing, for one transmitter to reach multiple receivers using the same wavelength, and for one receiver to receive different subcarriers from multiple wavelengths (thus multiple transmitters). All-optical switching (e.g. through wavelength selective switch, or WSS) if done in sub-wavelength level, for subcarriers to go from one transmitter to different receivers; each receiver receives multiple wavelengths that carry different subcarriers. This method has only a limited number of sharing capability and not very efficient in spectral usage because of the needs for guardband.

OPST method uses ring topology. Each port is treated as a node in a ring, and is able to access any other ports in the ring. Each receiver accepts a dedicated wavelength and works in burst mode; each transmitter has a tunable laser to put the inserted packet to the corresponding wavelength based on its header. The packet (or a burst of aggregated packets) is sent only when the particular wavelength is idle. The channel access technology is similar to CSMA (carrier sensing multiple access) which is used in traditional shared media Ethernet. The solution has several drawbacks: 1) application limited to ring topology; 2) limited maximum ring length; 3) tolerance of power fluctuations; 4) large number of carriers to sense; 5) larger latency; among others.

SUMMARY

In one aspect, a network switch is disclosed with each port having the function of: electrical processing and optical modulation; electrical processing has the ability to identify packet or frame destination; burst mode transmission and receiving capability; uses its pre-assigned time slot to send to the corresponding destination, or receive from the expected source.

Implementations of the above aspect may include one or more of the following. The optical path and time slot allocation can happen prior to data communication. The network switch port can be a tunable laser, with a mapping table for which wavelength and particular time slot to use to reach a particular receiver. The receiver uses a fixed wavelength or the receiver expects different wavelength from different transmitter. The receiver can be a coherent receiver; with a tunable laser that tunes LO to the proper wavelength when it is expecting signal from a particular transmitter. The electrical processing module maintains the queues for packets/frames to different destinations. The transmitter reads a burst from the corresponding queue when the time slot to its destination comes; the burst length matches the assigned time slot length. Time slot assignment involves time offset estimation, delay estimation, and available time slots negotiation. The system may use GPS or network clock as reference. The delay can be that from receiver to transmitter then back to receiver. The delay can be that from transmitter to receiver, or can be that from transmitter or receiver to a third (or centralized) arbitrator. The time offset can be estimated by sending/receiving timestamp, and the round-trip delay. Time slot assignment can be done by receiver, based on the available period in both the transmitter and receiver itself. The time slot assignment can be done by transmitter, based on the available period in both the transmitter itself and the receiver. Time slot assignment can be done by a third (or centralized) arbitrator, with network overall time slot optimization. The operation can be done using frequency multiplexing, of which the transmission technology is OFDM, and the interaction uses different subcarrier from the normal data communication to avoid conflict; The subcarrier for the interaction can be utilized by normal data communication when no interaction is in process. The operation can be done by using the time slot that is pre-known to have no conflict. The time slot assignment, in particular the bandwidth, is based on either service agreement, or on dynamic traffic needs. For the latter case, the time slot is adjusted when traffic capacity changes. The port has a bidirectional optical path setup to a connected port, before time slot based operation starts, and before interaction with the connected port. The wavelength assignment and time slot assignment are handled by SDN (software defined networks) controller.

In another aspect, an optical network, that is composed of virtual switches, has multiple switch ports, each capable of burst-mode, time-slot based transmission and receiving, and the ability to identify packet/frame destination and put onto the corresponding optical burst.

Implementations of the above aspect may include one or more of the following. The time slot assignment, in particular the bandwidth, is based on either service agreement, or on dynamic traffic needs. For the latter case, the time slot is adjusted when traffic capacity changes. Each port is connected to another dedicated port, or to multiple ports. The network is organized in either a mesh or ring type or other type of topology. Traffic from/to a port is in burst mode if it is shared among multiple ports. A communication path, including the WDM path and burst connection, is setup before used for normal packet/frame transmission. Wavelength assignment and time slot assignment are handled by SDN (software defined networks) controller. Port level 1:N and N:N connection is achieved by time slot assignment and burst mode data transmission. Optical path and time-slot allocation can be done before data communication starts. The proposed solution is applicable for any type of network infrastructure, with the flexibility for both shared and dedicated connections. The system can use subcarrier multiplexing during the time offset/round-trip delay estimation period.

Other implementations may include one or more of the following:

1) Time-slot based burst mode transmission/reception. Each transmitter has a dedicated (and pre-allocated) time slot to send to a particular receiver. In the corresponding time slot, it sends a burst for the data (packets, or TDM frame) that has the destination at the specific receiver. The receiver expects data from a specific transmitter at the given time slot. Packets are sent only after their time slots are allocated.
2) Transmitter maintains a queue for each destination. When a time slot comes, it reads from the corresponding queue for which destination (receiver) the time slot belongs to.
3) For flexible wavelength switched path configuration, each transmitter may have a tunable laser, to use different wavelengths for different receivers. The wavelength switched optical path is also allocated before data communication happens.
4) Each receiver may also expect different wavelength from different transmitters. In coherent case, it requires the receiver to have a tunable laser, which can be set to the proper wavelength that is consistent with the transmitter
5) Time slot allocation involves time offset and round-trip delay estimation. This procedure can be done after the optical path setup, but before the normal communication between the two ports starts. The solution may also use a global clock like GPS clock or network clock
6) Time offset and round-trip delay estimation can be done by using the free time slot, or using different frequency (or subcarrier) from that used for normal communication
7) Time slot is allocated by choosing from those that are available for both the transmitter and receiver. It can be done either by the interaction through the two connected ports only, or with a third (or centralized) arbitrator involved Advantages of the preferred embodiments may include one or more of the following. The system provides a solution for any type of network topology with any granularity of bandwidth sharing, to increase network flexibility/programmability and reduce the capital expense (CapEx) and operating expense (OpEx). The deployment with bandwidth sharing can also be changed to dedicated point-to-point connection using the same system and with no service interruption, which means the capability of investment preservation. The present invention provides a method for an optical transponder port to have one to many (1:N) connection. That is, each transponder can send data to multiple receivers, and can receive data from multiple transmitters. This enables the capability of port capacity sharing among multiple sites, for CapEx and OpEx savings.

DESCRIPTION

Figure 1A:
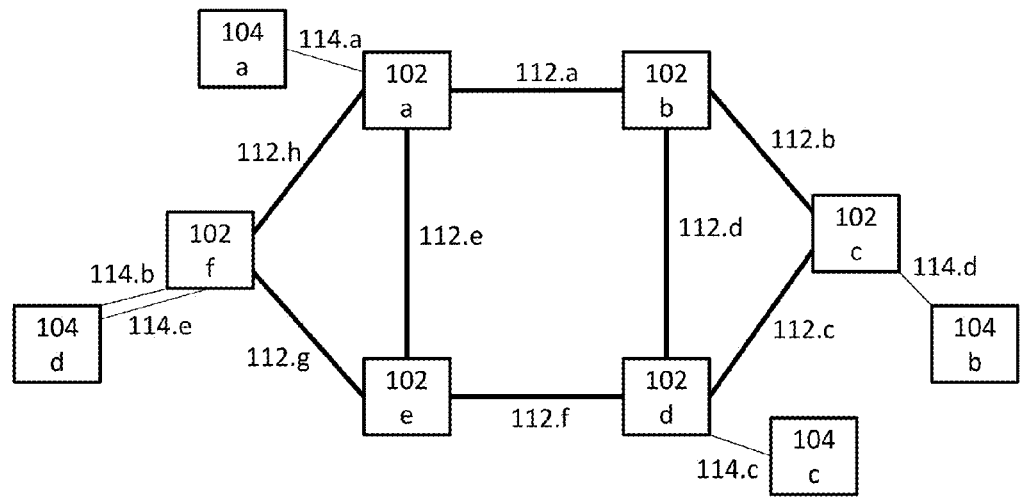
FIGS. 1A-1C show conventional network and traffic delivery methods.
Figure 1B:
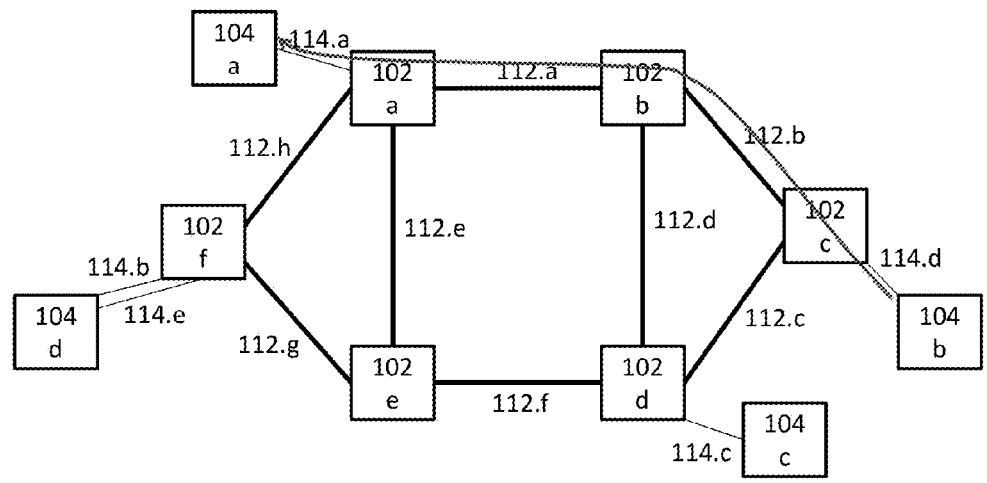
Figure 1C:
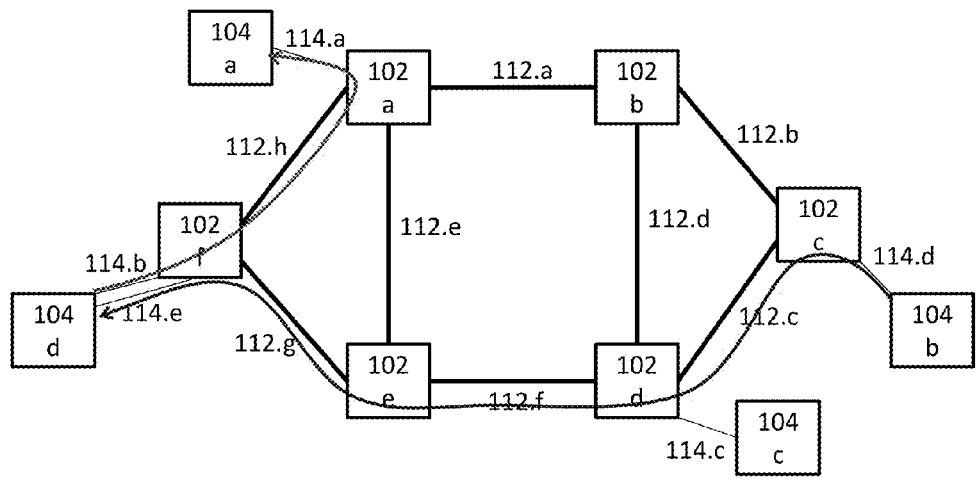
Figure 2:
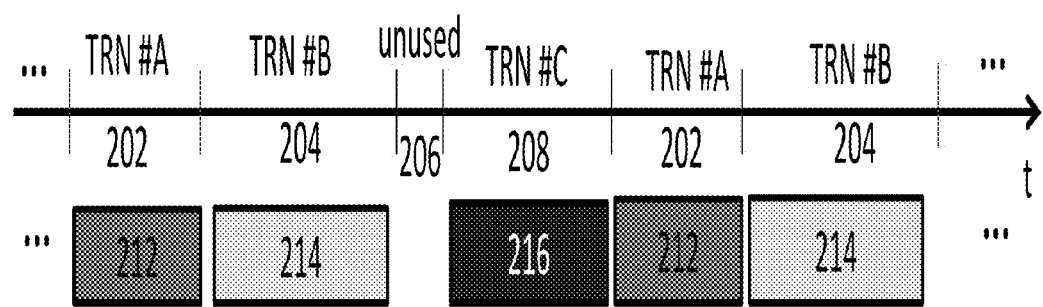
FIG. 2 shows an exemplary timeslot allocation for traffic to receiver K.
Figure 3:
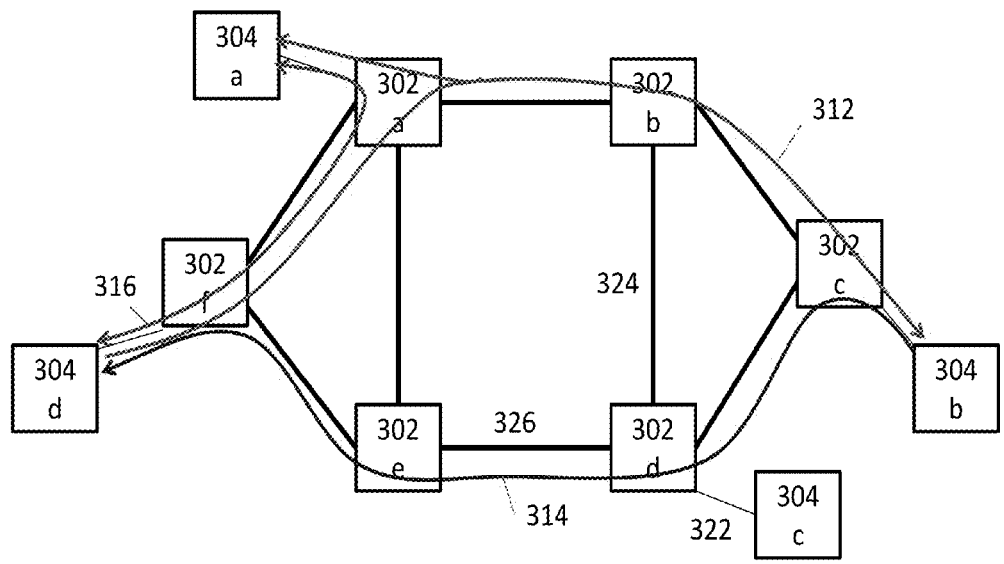
FIG. 3 shows a wavelength usage example.

FIG. 2 shows an exemplary timeslot allocation for traffic to receiver K, while FIG. 3 shows a wavelength usage example. The preferred embodiment is for a network switch that enables a single receiver to accept signals from multiple transmitters, and one transmitter to send signal to multiple receivers, both in TDM (time-division multiplexing) mode. A transmitter and receiver (or called transceiver) is called a port of the network switch. For the illustration in FIG. 3, nodes 302.a through 302.f are wavelength switching nodes; 304.a through 304.d are the network switching ports which are the focus of the preferred embodiment. The interconnection, either between two switching nodes, or between a network switching port and the optical switching node, are optical paths.

The preferred embodiment divides the receiver bandwidth into pre-configured time slots, and assigns the time slots to the connected transmitters. Each transmitter is only allowed to transmit to the particular receiver at its assigned time slot. The time slots are allocated based on bandwidth usage policy and/or traffic load, plus network-wide or receiver's optimization result. This idea is shown in FIG. 2. For receiver K, it has 3 allocated time slots 202, 204, and 206, which is assigned to transmitter #A, #B, and #C respectively. These transmitters can only transmit in their corresponding time slots, like burst 212, 214, and 216 in FIG. 2.

Besides the assigned time slot for a transmitter to reach a receiver, there is also wavelength assignment for each receiver. The transmitter can have a tunable laser to set to the proper wavelength. In most cases, the receiver accepts fixed wavelength, especially when the receiver uses coherent detection; but for network level flexibility and optimization purpose, there may be the needs to receive different wavelengths from each transmitter, in which case a tunable laser is needed to work as LO (local oscillator) in receiver side. One wavelength allocation example is shown in FIG. 3: node 304.a uses wavelength 316 to transmit to and receive from node 304.d; 304.b receives wavelength 312 from both 304.a and 304.d; 304.d receives wavelength 316 from 304.a and 314 from 304.b.

The data communication happens after the path is setup, which involves both the wavelength assignment and time slot allocation.

The wavelength, time slot and capacity assignment can be handled by a centralized controller, for example the software-defined networks (SDN) controller. Bandwidth assignment can be based on service agreement, or based on traffic demand.

Figure 4:
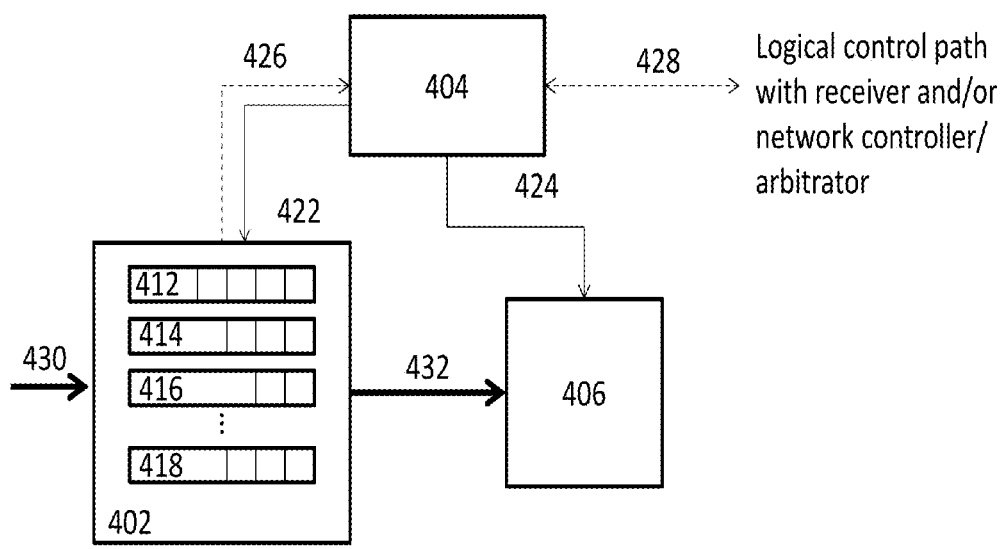
FIG. 4 shows an exemplary illustration for the transmitter of a network switching port.

FIG. 4 shows an exemplary illustration for the transmitter of a network switching port. The network switch port by function is the integration of traditional transponder (for example, for 100 GE or OTN-4 interface to enable long-haul optical transmission) and electrical switching/multiplexing interface, where the electrical switching/multiplexing part has its queue management module, to buffer the packet/data in different queues according to their destination (and QoS if to support different service level). A transmitter uses its allocated time slot (and with corresponding wavelength if applicable) to send data to a receiver. The network switching port can be the line card and interface of an electrical switch, or a system that interfaces with another standalone switch. In FIG. 4. 402 is the queue management module, to organize the received packets or frames in their corresponding buffer based on their destination and service type, for example queue 412 through queue 418; 404 is the controller that is responsible for wavelength/time-slot allocation and/or reaction, plus packets read out control (via path 422) and optical transmission control (like laser tuning, power controlling, through path 424); 406 is the optical transmitter that modulates the packet or frame burst into the allocated wavelength and time slot. Path 430 is the packet or frame input interface which is either from another equipment interface (like OTN or Ethernet), or from the backplane of an electrical switch. Path 432 is data interface from queue management module readout to optical transmitter, for data transmission. 404 uses logical path 428 (for example, by sharing the optical transceiver) to interact with receiver and/or network controller to get information for wavelength and time slot assignment.

Time slot allocation is detailed next. There are three items related to time slot allocation: time offset and transmission latency estimation; allocation of the particular time slot start/end time; and bandwidth.

Next, time offset and transmission latency estimation are detailed. Time offset estimation refers to the procedure to measure the time difference between a transmitter and the corresponding receiver, or the difference between the transmitter/receiver and an arbitrator.

In one embodiment, transmitter and receiver nodes may use GPS clock or network clock if available. Under this configuration, the time offset will be small and can be ignored.

Figure 5:
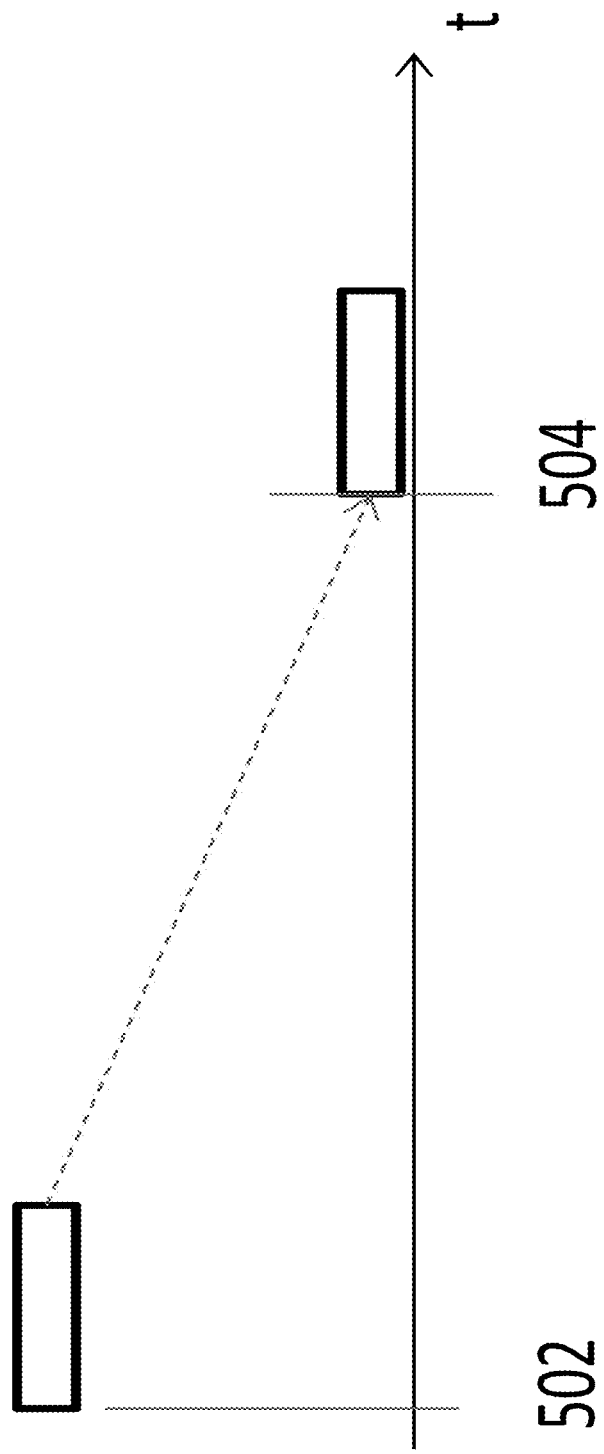
FIG. 5 shows an exemplary transmission latency illustration.

FIG. 5 shows an exemplary transmission latency illustration. Transmission latency refers to the period from the time transmitter logic (for example module 404 in FIG. 4) starts to send signal (time 502 in FIG. 5) to the time it is detected by receiver logic (time 504 in FIG. 5). When a third arbitrator is used for time slot allocation, it will compensate the announced time slot using the corresponding transmission latency.

In one embodiment, the receiver sends a probe message and uses the received response to estimate the time offset and/or round-trip delay. This requires a bidirectional connection, either through the same or different paths. When a port is activated for a certain receiver, its transmitter and the corresponding receiver start the estimation process. Consider the network in FIG. 3, let the transponder (i.e., that network port) 304.b be the newly added port, and one of the ports that it will send traffic to is 304.a. In one embodiment, 304.a sends a pulse or a timestamp to the transmitter port. Upon detection of the pulse, 304.b sends out its response immediately. 304.a calculates the round trip delay. This round-trip delay is considered when time slot is allocated by 302.a and sent to 304.b. In one embodiment, 304.b responses with a timestamp; 304.a then uses the probe sending time, received timestamp, and receiving time to calculate the time offset and round trip delay, then to compensate the time slot before notifying 304.b.

Time slot allocation is discussed next. Three factors affect the time slot allocation: required bandwidth, receiver time slot availability, and transmitter time slot availability. Wavelength availability is another factor to consider, but for WDM network with fixed (or slow changing) wavelength switching, it is independent of time slot allocation, though the two can be combined in case of fully dynamic and fast changing WDM network. The required bandwidth is usually configured by network operator or using control software and is known by the transmitter or receiver or both before time slot allocation happens.

Figure 6:
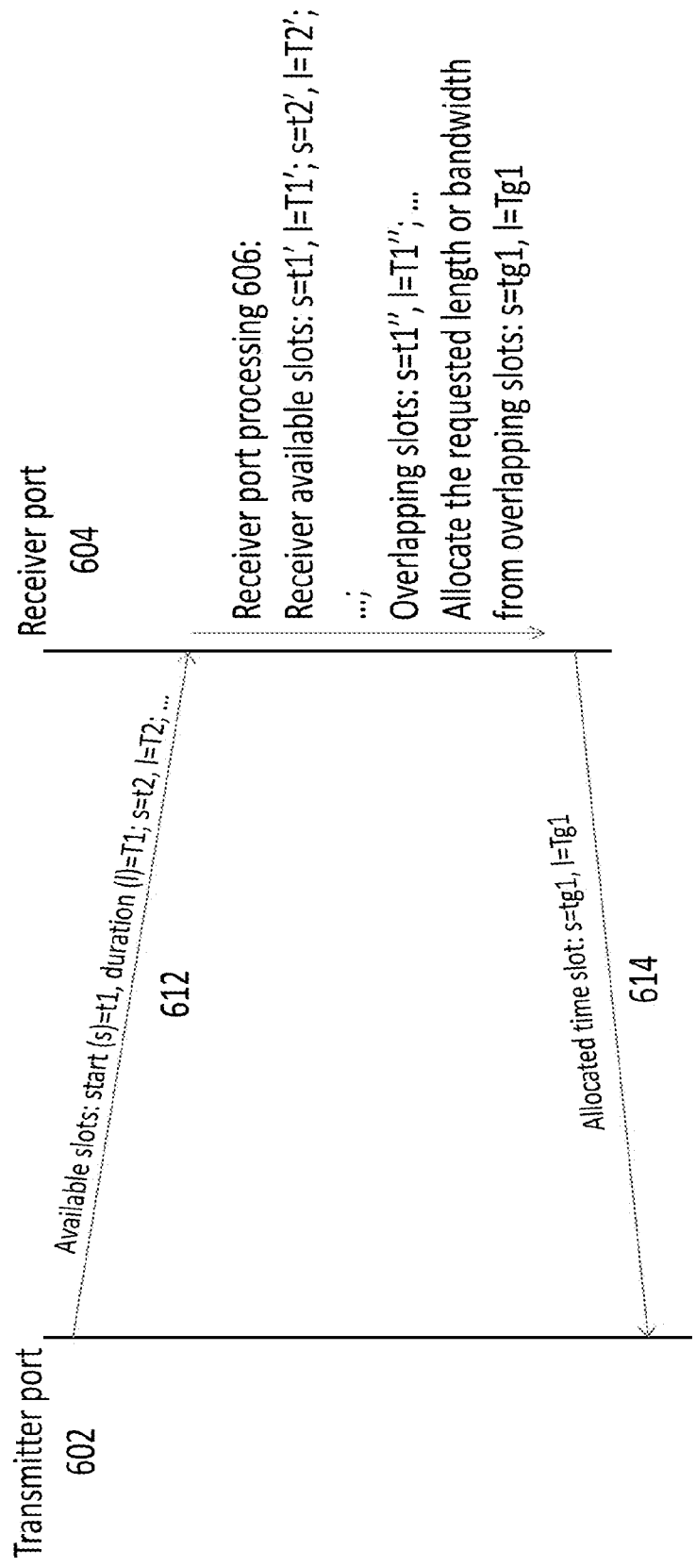
FIG. 6 shows an exemplary procedure of time slot allocation, by interaction between transmitter and receiver.

In one embodiment, the transmitter node (e.g., 302.c in FIG. 3) sends its available time slots which may include the start time and duration of each unallocated period. The receiver node (e.g., 302.a in FIG. 3) then allocates from the overlapping period that is available in both the transmitter and receiver itself. This procedure can also be started from receiver node and decided by transmitter node. This procedure is given in FIG. 6, which shows an exemplary procedure of time slot allocation, by interaction between transmitter and receiver.

In one embodiment, a third arbitrator collects the available time slots information, and allocates to the connected ports. This solution enables the arbitrator to use its global knowledge to achieve network-level optimization, which increases bandwidth usage efficiency.

There are two schemes for bandwidth allocation, which further affects the number of allocated time slots or time slot length. One is based on service agreement or other network policy, which is pre-set in a centralized controller or in the transmitter or receiver port; the second is based on traffic capacity demand. For the latter case, in one embodiment, the transmitter monitors each queue length or traffic amount for each queue, and requests for modification on the allocated bandwidth based on monitoring result.

Wavelength selection is detailed next. For slow-changing WDM switched network, the optical connection can be treated as fixed path, which means from point A to point B, there is a path with dedicated wavelength. In such network, transmitter has a tunable laser, to select the wavelength for each time slot based on the receiver it wants to reach. Each receiver can be a broadband receiver that is able to detect any wavelength. For coherent receiver case, the local oscillator shall be a tunable laser, detect a particular wavelength for each time slot.

In WDM path setup phase, the wavelength assignment controller may also consider to have a fixed wavelength for all the transmitters to reach a certain receiver. Each transmitter will have the same destination-to-wavelength mapping table, so that the receiver always processes the same wavelength.

For a ring-type or broadcast/multicast capable optical network, or optical networks with fast tuning optical switches, the transmitter wavelength can be fixed as well, to either let the WSS deliver to the proper destination, or have the receiver select the proper wavelength.

Figure 7:
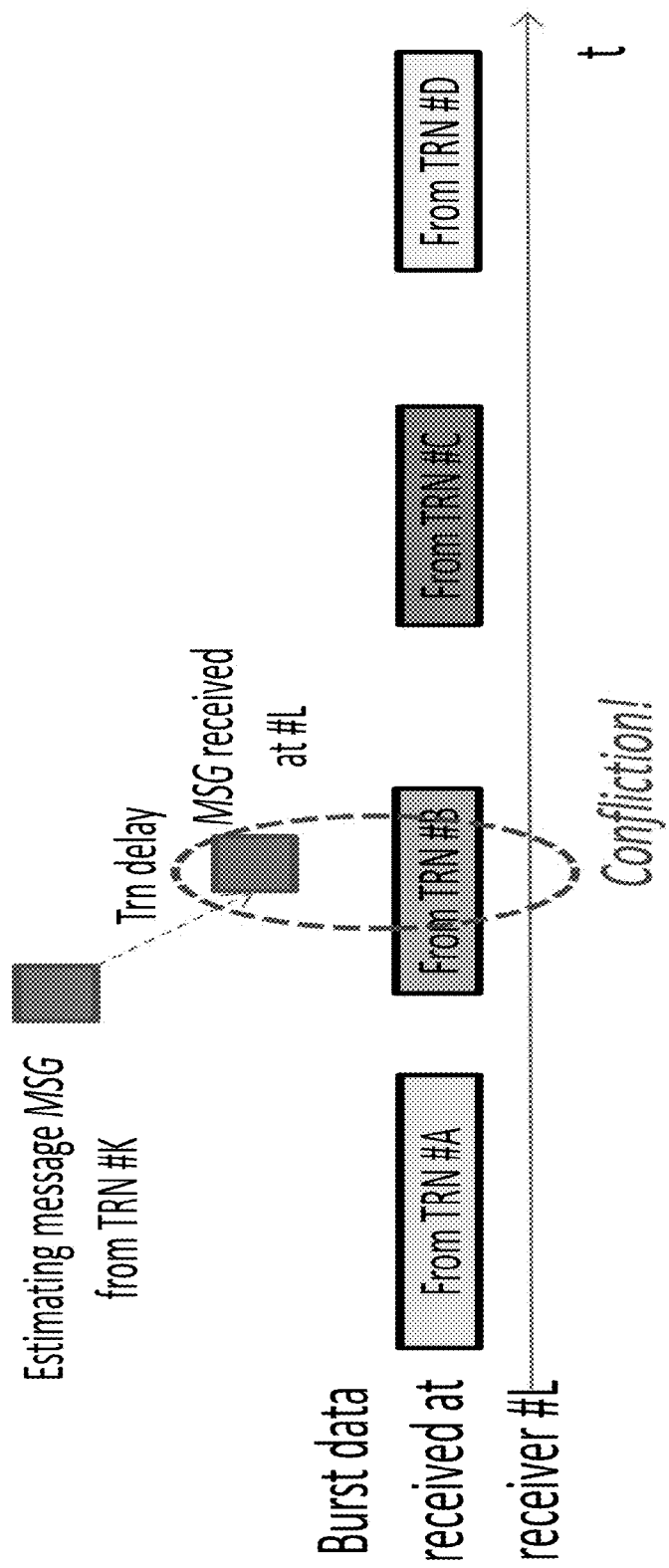
FIG. 7 shows an exemplary illustration of estimating message confliction with data burst.
Figure 8A:
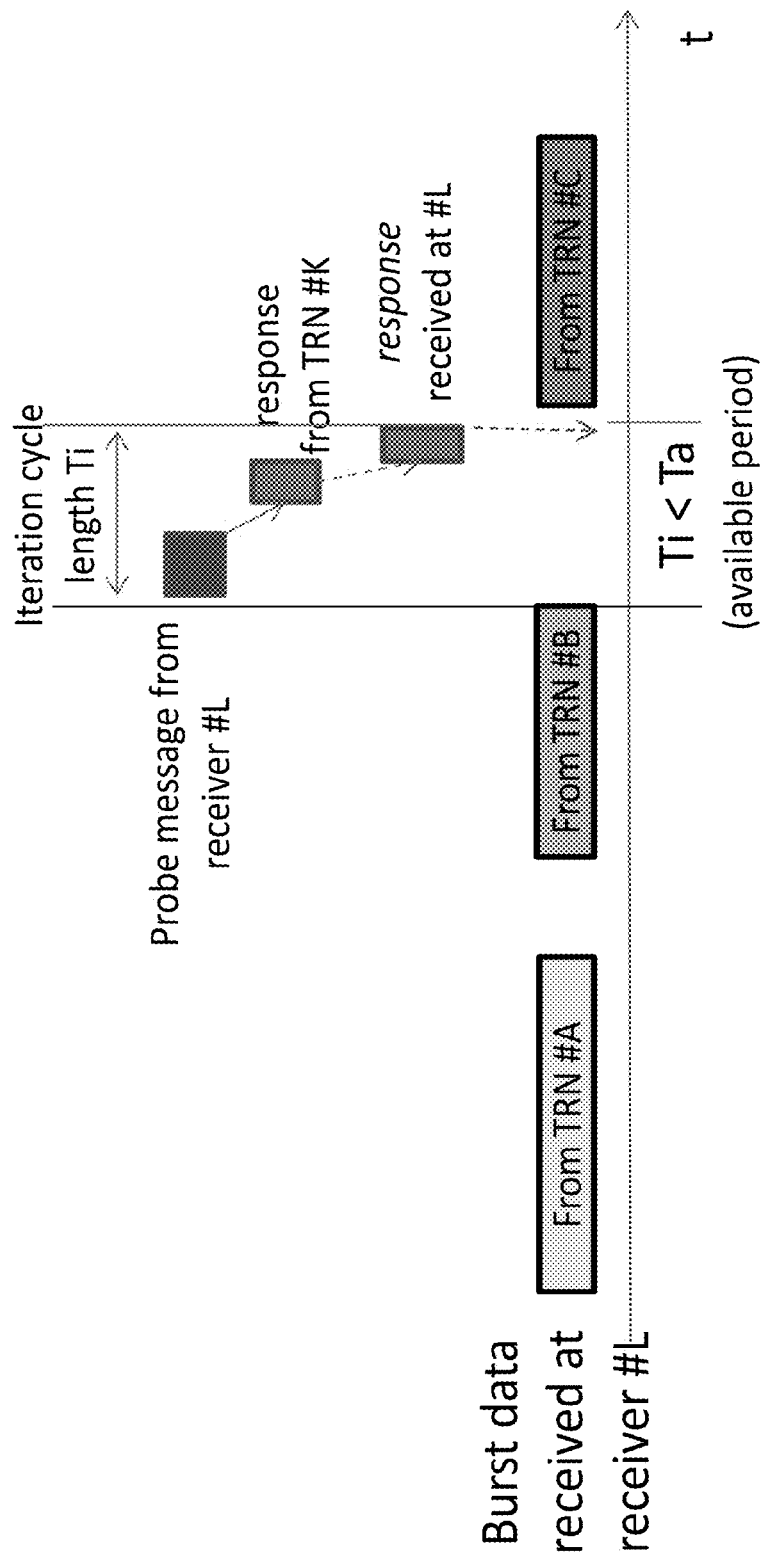
FIGS. 8A-8B show exemplary methods to receive response message in available time slot.
Figure 8B:
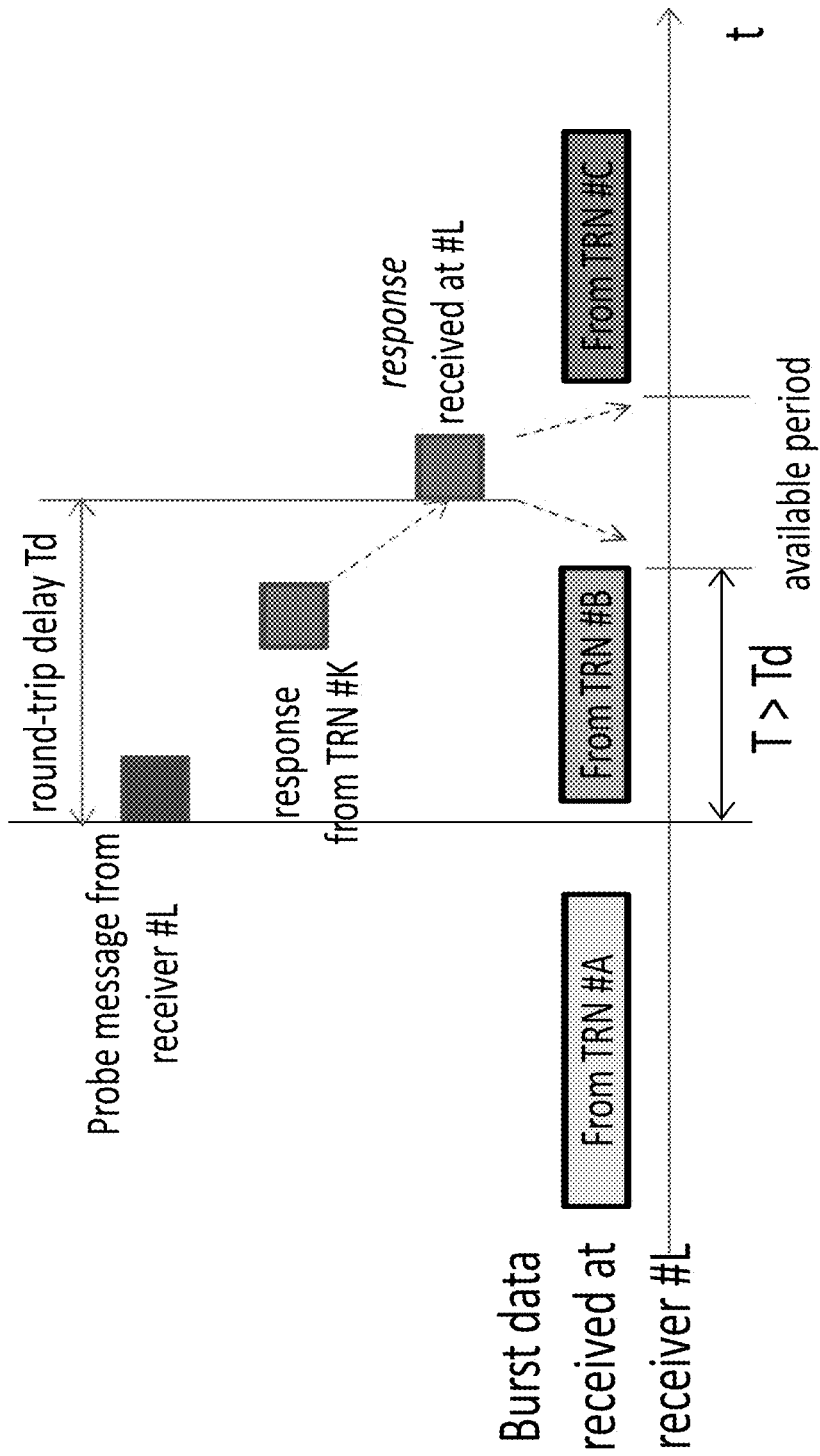

Turning now to conflict avoidance, during the procedure to estimate time offset and/or round-trip delay (say using estimating message), the transmitter may not have information about the available time slot, so it may corrupt the transmission of another port (FIG. 7) which shall be avoided. FIG. 7 shows an exemplary illustration of estimating message confliction with data burst, while FIG. 8A-8B show exemplary methods to receive response message in available time slot.

In one embodiment, the receiver sends the probe message at the beginning of its available time slot. The round trip delay shall be less than the duration of the time slot, so that no other ports will be transmitting to the receiver (FIG. 8 a)).

Alternatively, the receiver may send the probe message T-second before the beginning of an available time slot, with knowledge that the round trip delay will be larger than T (FIG. 8 b)). This is useful when one port is newly activated.

Figure 9:
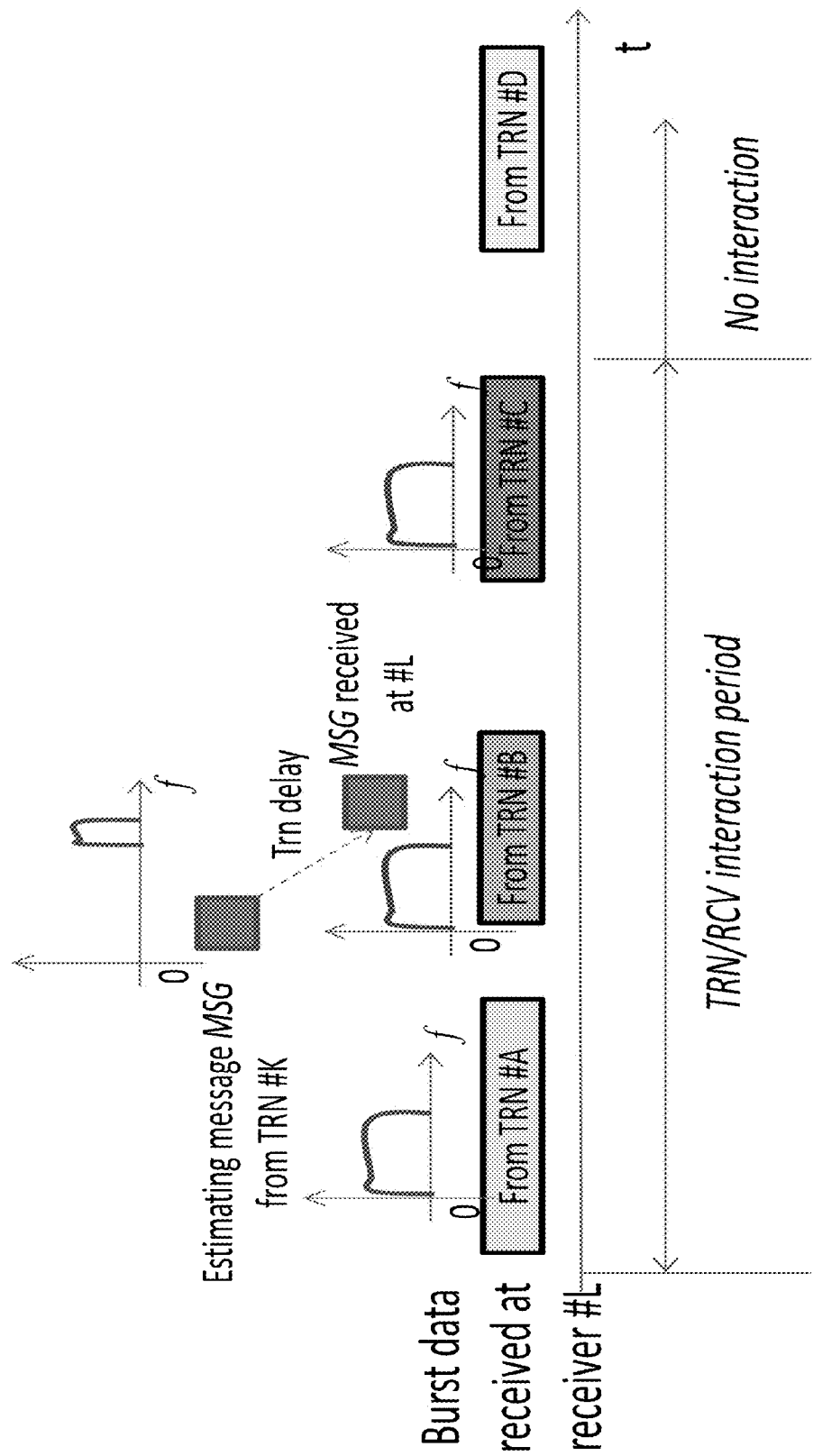
FIG. 9 shows an exemplary frequency/subcarrier division multiplexing for interacting message and data transmission.

FIG. 9 shows an exemplary frequency/subcarrier division multiplexing for interacting message and data transmission. The more flexible method is using frequency multiplexing such as OFDMA (Orthogonal Frequency Division Multiple Access), for regular data sending and time offset/round-trip delay measuring. When no measurement is in process, a transmitter is allowed to use full bandwidth in its allocated time slot. This is given in FIG. 9.

Time slot maintenance is the operation to keep the transmitter and/or receiver stay in the assigned time slot. Even the transmitter is assigned a time slot, in free-run (i.e., transmitter and receiver ports have independent clock; no adjustment between the two ports) state, eventually it may have the transmission window completely out of the expected range of the receiver. The solution is to have the receiver send its time information and/or time slot adjustment command. This command sending can be using its assigned transmission slot, or using subcarrier multiplexing. The transmitter may adjust its time slot based on this information. Because each transmitter may have multiple connected receivers, the time slot adjustment based on one receiver may make it overlap with the window of the other receivers. This result in the requirement of network level synchronization.

Time slot modification happens during normal operation, under the circumstances such as allocated bandwidth change, and the time slot shifting for more efficient bandwidth utilization. The procedure can be similar to time slot allocation mentioned above. For the case of time slot removal, which means disconnecting the pair, the sending and receiving paths to a port will be terminated at the same time. This can be done by interaction between the two ports, or by the command from a third arbitrator.

The techniques described herein may be implemented in hardware, software, firmware, or any combination thereof. Various features described as modules, units or components may be implemented together in an integrated logic device or separately as discrete but interoperable logic devices or other hardware devices, including optical hardware components. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software, the techniques may be realized at least in part by a computer-readable medium comprising instructions that, when executed, cause a processor to perform one or more of the methods described above. For example, the computer-readable medium may store such instructions.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled. Various aspects have been described in this disclosure. These and other aspects are within the scope of the following claims.

What is claimed is:

1. A method for optical communication using a plurality of nodes each including a transmitter, a receiver, and an optical modulator controlled by a processor, the method comprising:
    assigning an optical network wavelength for one port to reach another with a bidirectional path using either the same or a different wavelength;
    estimating a time offset and/or channel delay to determine available time slot and time slot allocation; and
    allocating a time slot based on bandwidth request and the sharing with other ports and enabling time sharing of the transmitter or the receiver for data communication, wherein each transmitter or receiver has a time slot and a mapping table, so that a transmitter sends data at one or more dedicated time slots to a particular receiver, and a receiver receives data at the given slot from a predetermined transmitter, wherein the transmitter sends available time slots with start time and duration of each unallocated period and the receiver allocates from overlapping period available in the transmitter and receiver.

2. The method of claim 1, comprising allocating optical path and time slot allocation prior to data communication.

3. The method of claim 1, comprising providing a transmitter port including a tunable laser with a mapping table to select a wavelength to reach a particular receiver or to use the particular time slot.

4. The method of claim 1, wherein the receiver uses a fixed wavelength or different wavelength from different transmitter.

5. The method of claim 1, wherein the receiver expects different wavelength from different transmitter and wherein the receiver is a coherent receiver with a tunable laser that tunes a local oscillator to a predetermined wavelength when expecting signal from a particular transmitter.

6. The method of claim 1, comprising maintaining queues for packets or frames to different destinations.

7. The method of claim 1, wherein the transmitter reads a burst from a corresponding queue when the time slot to its destination comes and wherein a burst length matches an assigned time slot length.

8. The method of claim 1, comprising assigning a time slot with time offset estimation, delay estimation, and available time slots negotiation.

9. The method of claim 8, comprising using a GPS or network clock as a reference.

10. The method of claim 8, comprising determining a delay from receiver to transmitter then back to receiver, from transmitter to receiver, or from transmitter or receiver to a third arbitrator.

11. The method of claim 8, wherein a time offset is estimated by sending/receiving timestamp, and a round-trip delay.

12. The method of claim 1, comprising assigning a time slot by receiver based on the available period in both the transmitter and receiver, by transmitter based on the available period in both the transmitter itself and the receiver, or by a third (or centralized) arbitrator, with network overall time slot optimization.

13. The method of claim 1, comprising operation can be done using frequency multiplexing.

14. The method of claim 1, comprising transmitting with OFDM with a different subcarrier from data communication to avoid confliction.

15. The method of claim 1, wherein the port has a bidirectional optical path setup to a connected port, before time slot based operation starts, and before interaction with the connected port.

16. The method of claim 1, wherein the pre-assigned time slot comprises a bandwidth that is based on either a service agreement, or on dynamic traffic needs where the time slot is adjusted when traffic capacity changes.

17. The method of claim 1, wherein a wavelength assignment and time slot assignment are handled by SDN (software defined networks) controller.

* * * * *